Patented June 23, 1936

2,044,790

UNITED STATES PATENT OFFICE 2,044,790

DYESTUFF PREPARATION

Richard Herz and Walter Brunner, Frankfort-on-the-Main, Germany, assignors to General Aniline Works, Inc., New York, N. Y., a corporation of Delaware No Drawing. Application November 30, 1931, Serial No. 578,201. Renewed December 10, 1934. In Germany December 2, 1930

4 Claims. (Cl. 8—6)

The present invention relates to new dyestuff preparations.

In the French Patent No. 693,904 dated April 14, 1930, there are described new reduction products of certain thioindigoide dyestuffs, which are difficultly soluble in aqueous alkalies and which may be prepared in one of the following ways: Symmetrical or asymmetrical dyestuffs of the thioindigoide series which are substituted in their molecule at least once by halogen, alkyl or alkoxy are subjected to an alkaline reduction in the presence of a quantity of an agent of alkaline reaction smaller than that used in practice for preparing the vat of the said dyestuffs. The reduction may be effected in the presence of an alcohol or an agent of similar action. The separation of the stable reaction product may be completed by subsequently treating the alkaline reaction mixture with an acid, preferably with a carboxylic or sulfurous acid. The stabilization of the reduction product may be accelerated by treating it with a diluted acid. The reduction may be effected by subjecting the thioindigoide dyestuffs to a hydrogenation process, preferably in the presence of a catalyst capable of accelerating the hydrogenation. In the following description and the claims the term "stable reduction product" is to be understood as meaning the products obtainable according to one of the above described methods. The said products are differentiated from the known "leuco compounds" especially by their good printing capacity and their stability to oxidizing agents such as air. With some of the said reduction products and especially with those of the thioindigoide dyestuffs having in their molecule at least once the radical

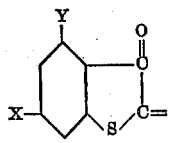

wherein X represents halogen and Y stands for alkyl, the best printing results and the most intense development of the prints are obtainable when carrying out the printing process in the presence of a water-soluble hydrotropical substance, such as a water-soluble salt of benzyl-sulfanilic acid, dimethyl-sulfanilic acid or α-naphthalene-sulfonic acid (cf. "Neuberg, Biochemische Zeitschrift", vol. 76 (1916) pages 107–176, reported in the "Chemische Centralblatt" 1916 II pages 970 and 971) and in some cases in the presence of a salt of a heavy metal.

When preparing dyestuff preparations containing one of the said stable reduction products and a water-soluble hydrotropical substance, it has been found, however, that the presence of the water-soluble hydrotropical substance in such dyestuff preparations tend to enolize the said stable reduction product into the corresponding leuco compound which, on its turn, is easily reoxidized by the influence of air to the dyestuff proper. In this way, by the time the printing capacity of such preparations may be considerably diminished, especially in countries with a hot climate. It is inadvisable, therefore to manufacture and to market or to store such preparations.

The aim of our invention is to provide for preparations containing one of the said stable reduction products and a derivative of a hydrotropical substance but being marketable and storable for any time and possessing as good a printing capacity as the dyestuff preparations mentioned before.

We have found that this aim can be attained by manufacturing such dyestuff preparations as contain one of the said stable reduction products and such a derivative of a hydrotropical substance as is insoluble or difficultly soluble in water under usual conditions of storing and marketing, but is capable of yielding a water-soluble form of the hydrotropical substance in question under the conditions under which the printing process proper is carried out.

These dyestuff preparations are marketable and storable for any time inasmuch as the water-insoluble or difficultly soluble derivatives of the hydrotropical substances do not exert any enolizing action on the stable reduction products of the thioindigoide dyestuffs under usual conditions of storing and marketing. It is surprising that under the conditions of the printing process proper, i. e. especially by the addition of alkali and by the elevated temperature of the steaming process, some kind of a chemical reaction occurs, whereby our new dyestuff preparations attain as good a printing power as the preparations prepared with the aid of water-soluble hydrotropical substances.

For the purpose of our invention one may use, for instance, a water-insoluble salt of the hydrotropical substances such as the tin salt of benzyl-sulfanilic acid, dimethylsulfanilic acid or α-naphthalene-sulfonic acid or a corresponding organic salt such as the benzidine salts of the acids mentioned before or a mixture of the tin salt of benzylsulfanilic acid with the free base of benzidine. Instead of adding a ready-made water-insoluble derivative one may add to the dyestuff preparation with a similar result two or more components which are capable of yielding in the dyestuff preparation a water-insoluble or difficultly soluble hydrotropical substance of the kind described before. Since the hydrotropical substances mentioned herein may also be named dispersing agents, the latter expression has been used in the following claims.

It is understood that the new dyestuff preparations may contain further constituents such as glycerol, starch or other thickening agents or other agents known for improving dyestuff preparations or printing pastes.

The following examples serve to illustrate the invention, but they are not intended to limit us thereto, the parts being by weight:

(1) 20 parts of the stable reduction compound of 4.4'-dimethyl-6.6'-dichlorothioindigo, obtainable according to the process of French Patent No. 693,904 (U. S. application Serial No. 441,720 filed April 4, 1930), are intimately ground in a ball mill with about 40 parts of glycerol, 9 parts of the benzidine salt of benzylsulfanilic acid, 4 parts of iron vitriol and 127 parts of water. A light brownish-red paste having the above described properties is thus obtained.

(2) 22 parts of the stable reduction compound as used in Example 1 are ground in a ball mill with 44 parts of glycerol, 25 parts of tin benzylsulfanilate and 105 parts of water, whereby a uniform reddish-blue paste is obtained. In order to obtain a completely uniform paste, a small quantity of one of the condensation products obtainable according to U. S. Patent No. 1,237,405 is advantageously added to the paste.

(3) A printing paste is prepared from 100 grams of the paste obtained according to Example 1 or 2, containing 10–13% of the stable reduction compound
70 grams of glycerol
400 grams of wheat starch tragacanth thickening
120 grams of potassium carbonate
70 grams of formaldehyde sulfoxylate
240 grams of water 1000 grams After printing and drying, the material is steamed for a short time in a rapid ager (2 to 3 minutes), oxidized and soaped while boiling. The printings, thus obtained, as regards their intensity of color and beauty of shade, far surpass the printings obtained according to the known printing process.

When using for stable reduction products such as the stable reduction compound of 4.4'-dimethyl-6.6'-dibromothioindigo or 4.4'-dimethyl-6.5'.7'-trichlorothioindigo, similar results are obtainable.

We claim:

1. As new compositions of matter, dyestuff preparations comprising the stable reduction product of a thioindigoide dyestuff which contains in its molecule at least once the atomic grouping:

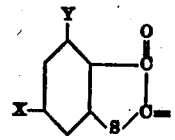

wherein X represents halogen and Y stands for alkyl, and such a salt of a dispersing agent as is insoluble or difficultly soluble in water, but which is capable of being converted into a water-soluble form when steamed in the presence of alkali under the conditions under which printing processes are carried out.

2. As new compositions of matter, dyestuff preparations comprising the stable reduction product of a thioindigoide dyestuff which contains in its molecule at least once the atomic grouping:

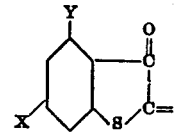

wherein X represents halogen and Y stands for alkyl, and such a salt of a compound of the group consisting of benzylsulfanilic acid, dimethylsulfanilic acid and α-naphthalene-sulfonic acid as is insoluble or difficultly soluble in water, but which is capable of being converted into a water-soluble form when steamed in the presence of alkali under the conditions under which printing processes are carried out.

3. As new compositions of matter, dyestuff preparations comprising the stable reduction product of 4.4'-dimethyl-6.6'-dichlorothioindigo and a tin salt of benzylsulfanilic acid.

4. As a new composition of matter, the dyestuff preparation consisting of 20 parts of the stable reduction compound of 4.4'-dimethyl-6.6'-dichlorothioindigo, 40 parts of glycerol, 9 parts of benzidine benzylsulfanilate, 4 parts of iron sulfate, 127 parts of water, being a light brownish-red paste of unlimited stability.

RICHARD HERZ.
WALTER BRUNNER.